(12) United States Patent
Shaffer et al.

(10) Patent No.: US 10,483,598 B2
(45) Date of Patent: Nov. 19, 2019

(54) LITHIUM REPLENISHMENT CELL TO ENHANCE BEGINNING OF LIFE CAPACITY

(71) Applicant: FORD GLOBAL TECHNOLOGIES, LLC, Dearborn, MI (US)

(72) Inventors: Christian Edward Shaffer, Canton, MI (US); Rutooj D. Deshpande, Farmington Hills, MI (US); Satish B. Chikkannanavar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 225 days.

(21) Appl. No.: 15/674,186

(22) Filed: Aug. 10, 2017

(65) Prior Publication Data

US 2019/0051949 A1 Feb. 14, 2019

(51) Int. Cl.
| | | |
|---|---|---|
| *H01M 10/42* | (2006.01) | |
| *H01M 10/04* | (2006.01) | |
| *H01M 10/0583* | (2010.01) | |
| *H01M 10/0525* | (2010.01) | |
| *H01M 10/44* | (2006.01) | |
| *H01M 10/052* | (2010.01) | |

(52) U.S. Cl.
CPC ... *H01M 10/4242* (2013.01); *H01M 10/0413* (2013.01); *H01M 10/052* (2013.01); *H01M 10/0525* (2013.01); *H01M 10/0583* (2013.01); *H01M 10/44* (2013.01); *H01M 2220/20* (2013.01)

(58) Field of Classification Search
CPC ........... H01M 10/4242; H01M 10/052; H01M 10/44; H01M 10/0525; H01M 10/0413; H01M 10/0583; H01M 2220/20
See application file for complete search history.

(56) References Cited

U.S. PATENT DOCUMENTS

| | | |
|---|---|---|
| 9,281,526 B1 | 3/2016 | Liu et al. |
| 9,559,384 B2 | 1/2017 | Takahashi |
| 2016/0294017 A1 | 10/2016 | Ebisuzaki et al. |

*Primary Examiner* — Eugenia Wang
(74) *Attorney, Agent, or Firm* — Dave Kelley; Brooks Kushman P.C.

(57) ABSTRACT

A method for fabricating an electrode sandwich includes, responsive to an amount of cyclable lithium lost being greater than a predefined threshold, initiating, by a controller, current flow between the sandwich and a lithium replenishment electrode in ionic conductivity with the sandwich via replenishment gaps to transfer lithium thereto, and, responsive to an amount of transferred lithium corresponding to the amount lost, hot-press sealing the replenishment gaps and detaching the replenishment electrode from the sandwich.

20 Claims, 7 Drawing Sheets

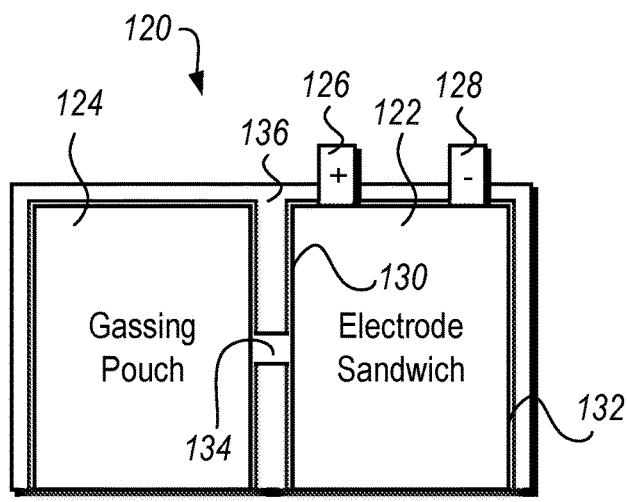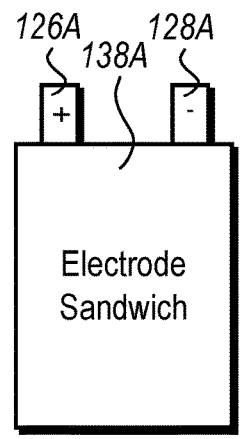
FIG. 5A  FIG. 5B
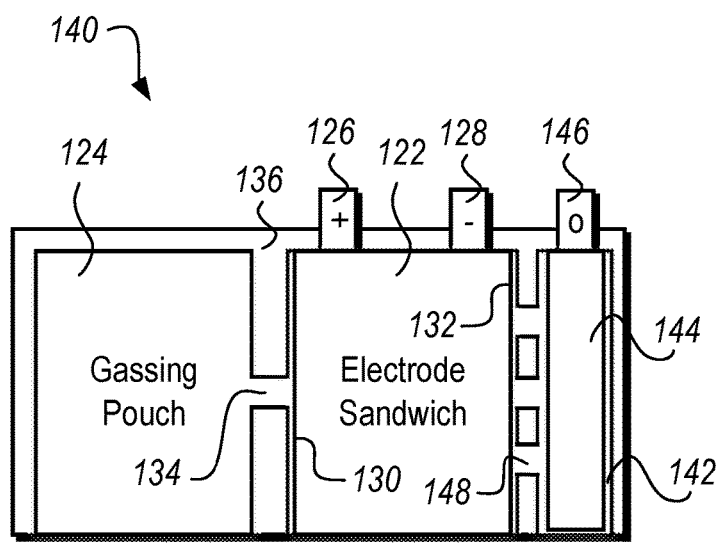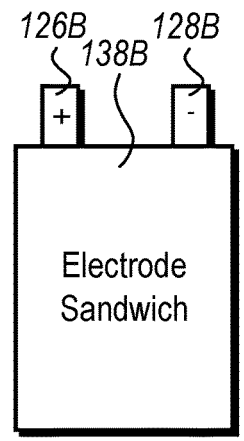
FIG. 5C  FIG. 5D

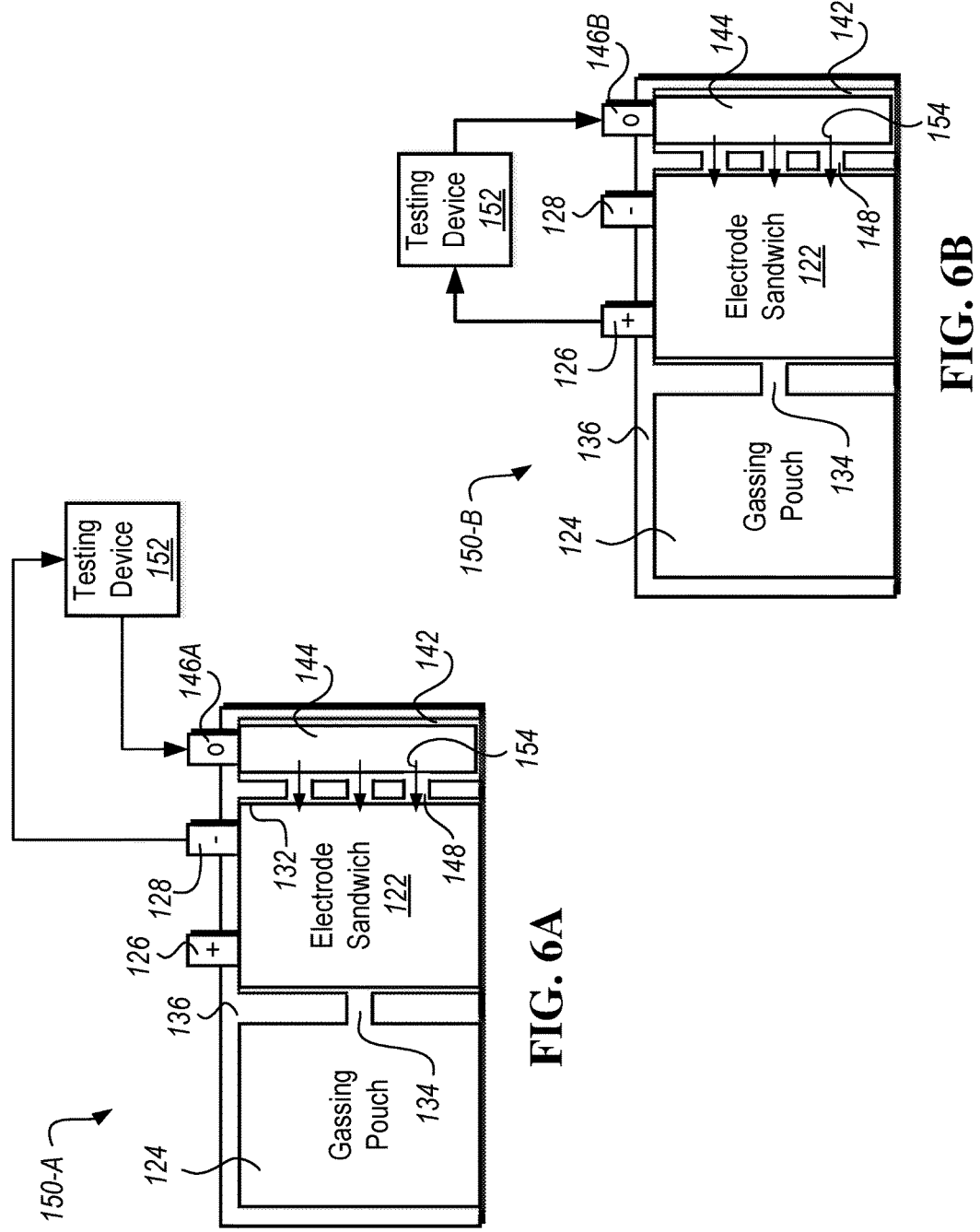

LITHIUM REPLENISHMENT CELL TO ENHANCE BEGINNING OF LIFE CAPACITY

TECHNICAL FIELD

The present disclosure relates to systems and methods for replenishing lithium in a cell of a traction battery.

BACKGROUND

A traction battery having a larger energy density may provide a greater electric-only drive range. For lithium-ion batteries, used in many modern electric vehicle (xEVs), such as hybrid electric vehicles (HEV), plug-in hybrid electric vehicles (PHEVs), and battery electric vehicle (BEVs), greater cell energy densities may be achieved by introducing new host materials and/or improving design of each of the cells. An amount of lithium in a given lithium-ion cell, also referred to as "cyclable lithium," may determine a capacity, and, therefore, energy density, of that cell.

SUMMARY

A method for fabricating an electrode sandwich includes, responsive to an amount of cyclable lithium lost being greater than a predefined threshold, initiating, by a controller, current flow between the sandwich and a lithium replenishment electrode in ionic conductivity with the sandwich via replenishment gaps to transfer lithium thereto, and, responsive to an amount of transferred lithium corresponding to the amount lost, hot-press sealing the replenishment gaps and detaching the replenishment electrode from the sandwich.

A battery cell includes an electrode sandwich having a pair of opposing walls, a gassing pouch connected along the first wall and defining a gassing gap therebetween, the gassing gap configured to transfer gasses from the electrode sandwich to the gassing pouch, and a lithium replenishment electrode region connected along a second wall and defining a replenishment gap configured to transfer lithium ions released by a replenishment electrode to the sandwich.

A method for fabricating an electrode sandwich of a battery cell includes, responsive to a solid electrolyte interphase layer forming in the sandwich, initiating, by a controller, current flow between the sandwich and a lithium replenishment electrode in ionic conductivity therewith via a replenishment gap to cause the replenishment electrode to supply lithium to the sandwich, and, responsive to the supplied lithium amount corresponding to an amount of lithium lost during the forming, hot-press sealing the gap and detaching the electrode.

BRIEF DESCRIPTION OF THE DRAWINGS

FIGS. 5A-5B are block diagrams illustrating a cell configuration during fabrication using a formation, sealing, and cutting (FSC) process and a final standard cell configuration, respectively;

FIGS. 5C-5D are block diagrams illustrating a cell configuration during fabrication using a formation, replenishment, sealing, and cutting (FRSC) process and a final lithium replenishment cell configuration, respectively, FIGS. 6A-6B are block diagrams illustrating example lithium replenishment approaches of the FRSC process using a third electrode region;

DETAILED DESCRIPTION

Figure 1:
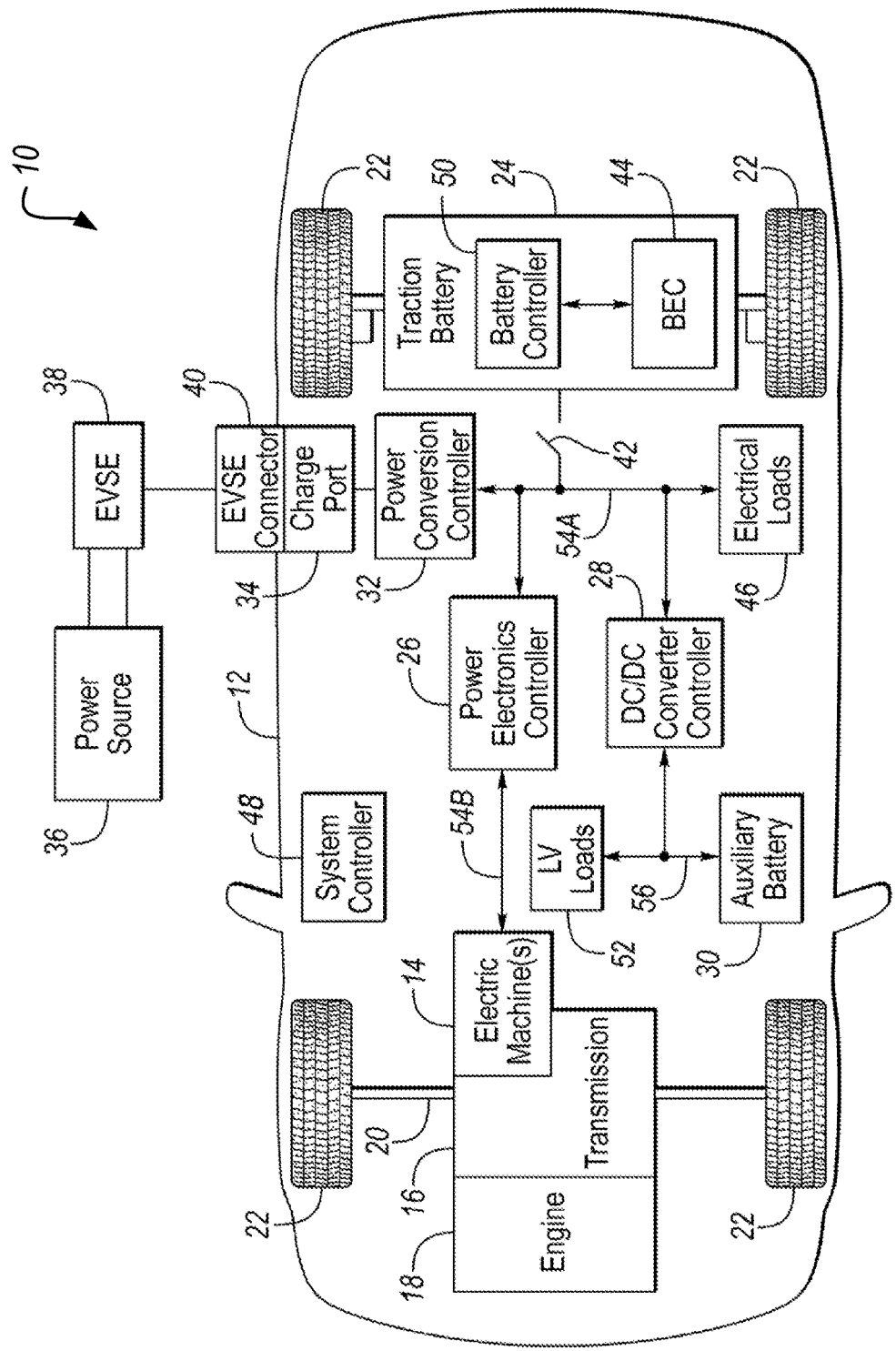
FIG. 1 is a block diagram of a plug-in hybrid electric vehicle (PHEV) illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A fabrication process of lithium-ion cells may include a formation phase involving a sequence of operations, such as, but not limited to, storage of the cell at a high temperature, a slow charge and discharge of the cell under well-controlled temperatures, and so on. During one or more operations of the formation phase a solid electrolyte interphase (SEI) layer may be formed on an anode active material surface and may be configured to stabilize the anode to minimize a capacity fade of the cell. The formation of the stable SEI layer may include a partial consumption of one or more materials of the cell, along with the limited supply of cyclable lithium, and may, thus, affect the capacity and/or energy density of the cell.

In one example, the cell capacity lost during the formation phase may be approximately 10% resulting in lower specific energy density of each of the cells in a pack and requiring a larger battery pack with more cells to produce a necessary amount of energy. Controlling or minimizing the amount of cyclable lithium lost during the formation phase may include adding electrolyte additives, such as vinylene carbonate (VC), acrylic acid nitrile, maleic anhydride, or methyl cinnamate, that stabilize the SEI during formation phase.

Replenishing the cyclable lithium lost during the formation phase (i.e. lost cell capacity) may include adding a step to the cell fabrication process to replenish the lost cyclable lithium. Thus, although some quantity of cyclable lithium may be consumed during the formation phase, the amount of cyclable lithium may then be restored to an amount of cyclable lithium prior to the formation phase.

The design and process described herein may be equally applicable for any Li-ion battery (traction, portable electronics, aviation, etc.). As one example, the design and process may also be useful for other chemistries that must undergo a similar fabrication process or one or more phases of the fabrication process, e.g., the formation phase.

In typical commercial Li-ion battery chemistries, the cathode active material may be fully or partially lithiated in its powder form prior to one or more of electrode, sandwich, and cell fabrication. This lithium may be the source of the cyclable lithium supply of the cell. Novel emerging battery chemistries, such as, but not limited to, sulfur-graphite cells, do not have a cyclable lithium source in the anode or cathode materials (in an example sulfur-graphite cell, a sulfur cathode material and/or graphite anode material). The lithium replenishment cell of the present disclosure may be used to lithiate a system that does not include cyclable lithium in its active materials (e.g. sulfur-graphite) to introduce lithium into the host materials via one or more phases to the replenishment step of the FRSC process.

FIG. 1 depicts a vehicle system 10 for a plug-in hybrid-electric vehicle 12. The vehicle 12 may comprise one or more electric machines 14 mechanically coupled to a hybrid transmission 16. The electric machines 14 may be capable of operating as a motor or a generator. In addition, the hybrid transmission 16 may be mechanically coupled to an engine 18. The hybrid transmission 16 may also be mechanically coupled to an axle 20 mechanically coupled to the wheels 22. While FIG. 1 depicts a typical plug-in hybrid electric vehicle, the description herein is equally applicable to a pure electric vehicle or a hybrid electric vehicle of a different configuration, such as, but not limited to, a series hybrid. For a pure electric vehicle, e.g., battery electric vehicle (BEV), the hybrid transmission 16 may be a gear box connected to the electric machines 14 and the engine 18 may not be present.

The electric machines 14 can provide propulsion and deceleration capability either while the engine 18 is operated or turned off. The electric machines 14 are capable of operating as generators and provide fuel economy benefits by recovering energy that would normally be lost as heat in a friction braking system. The electric machines 14 may additionally impart a reaction torque against the engine 18 output torque to generate electricity for recharging a traction battery 24 the while the vehicle is operating. The electric machines 14 may further reduce vehicle emissions by allowing the engine 18 to operate near the most efficient speed and torque ranges. When the engine 18 is off, the vehicle 12 may be operated in electric-only mode using the electric machines 14 as the sole source of propulsion.

A traction battery 24 stores energy that can be used by the electric machines 14. The traction battery 24 typically provides a high voltage direct current (DC) output. As discussed further in reference to FIGS. 4 and 5, one or more contactors 42 may isolate the traction battery 24 from a DC high voltage bus 54A when opened and couple the traction battery 24 to the DC high voltage bus 54A when closed. While the contactor 42 is illustrated as a separate component, in some examples, the one or more contactors 42 may comprise a bussed electrical center (BEC) 44 configured to communicate with a battery controller 50 allowing the supply and withdrawal of electric energy to and from the traction battery 24. The battery controller 50 may issue a command to the BEC 44 to operate a plurality of switches, e.g., open or close contactors or relays, or otherwise manipulate one or more electrical components controlling transfer of energy to the traction battery 24, in response to one or more operating parameters associated with the traction battery 24 reaching a predefined threshold.

The traction battery 24 is electrically coupled to one or more power electronics controllers 26 via the DC high voltage bus 54A. The power electronics controller 26 is also electrically coupled to the electric machines 14 and provides the ability to bi-directionally transfer energy between alternating current (AC) high voltage bus 54B and the electric machines 14. For example, the traction battery 24 may provide a DC output while the electric machines 14 may operate using a three-phase AC to function. The power electronics controller 26 may convert the DC output of the traction battery 24 to a three-phase AC input that may be necessary to operate the electric machines 14. In a regenerative mode, the power electronics controller 26 may convert the three-phase AC output from the electric machines 14 acting as generators to the DC input compatible with the traction battery 24.

In addition to providing energy for propulsion, the traction battery 24 may provide energy for other vehicle electrical systems. A vehicle 12 may include a DC/DC converter controller 28 that is electrically coupled to the high voltage bus 54. The DC/DC converter controller 28 may be electrically coupled to a low voltage bus 56. The DC/DC converter controller 28 may convert the high voltage DC output of the traction battery 24 and/or the power electronics controller 26 to a low voltage DC supply that is compatible with low voltage vehicle loads connected to the low voltage bus 56. In one example, the low voltage bus 56 may be electrically coupled to an auxiliary battery 30 (e.g., 12V battery). In another example, low voltage systems 52, such as, but not limited to, accessories, lighting, and so on, may also be electrically coupled to the low voltage bus 56.

One or more high voltage electrical loads 46 may be coupled to the high voltage bus 54. The high voltage electrical loads 46 may have an associated controller that operates and controls the high voltage electrical loads 46 when appropriate. The high voltage loads 46 may include compressors and electric heaters. The various components discussed may have one or more associated controllers to control and monitor the operation of the components. The controllers may communicate via a serial bus (e.g., Controller Area Network (CAN)) or via discrete conductors.

In one example, a system controller 48 may be present to coordinate the operation of the various components. The system controller 48, although represented as a single controller, may be implemented as one or more controllers. The system controller 48 may monitor operating conditions of the traction battery 24, the power conversion controller 32 and the electric machine 14. The traction battery 24 may be configured to receive signals indicative of magnitude and direction of current flow through the traction battery 24, voltage level across terminals of the traction battery 24, and so on.

The current sensor and voltage sensor outputs of the traction battery 24 are provided to the system controller 48. The system controller 48 may be configured to monitor state-of-charge (SOC) parameter of the traction battery 24 based on signals from one or more sensors, such as current and voltage sensors of the traction battery 24. Various techniques may be utilized to determine the SOC. For example, an ampere-hour integration may be implemented in which the current through the traction battery 24 is integrated over time. The SOC may also be estimated based on, for example, the output of a traction battery voltage sensor. The specific technique utilized may depend upon the chemical composition and characteristics of the particular battery.

An SOC operating range may be defined for the traction battery 24. The operating ranges may define an upper and lower limit at which the SOC may be bounded for the traction battery 24. The traction battery 24 of vehicle 12 may be recharged by an external power source 36 electrically coupled to an electric vehicle supply equipment (EVSE) 38, i.e., a charger or a charging station. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12 and may be electrically coupled to an on-board power conversion controller 32 that conditions the power supplied from the EVSE 38 to provide the proper voltage and current levels to the traction battery 24. Additionally or alternatively, the vehicle 12 may be configured to receive wireless power transfer via a wireless connection to the EVSE 38, such as, but not limited to, inductive charging over-the-air-gap.

While the EVSE 38 as illustrated in FIG. 1 includes a single connection to the EVSE connector 40, arrangements that include more than one connection, whether series, parallel, or a combination of series and parallel connections, between the EVSE 38 and the EVSE connector 40 are also contemplated. Likewise, while the charge port 34 is illustrated in FIG. 1 as being electrically connected to a single EVSE connector, e.g., EVSE connector 40, the disclosure is not so limited and arrangements including multiple EVSE connectors, e.g., the EVSE connectors 40, connected to the charge port 34, whether in series, in parallel, or as a combination of series and parallel connections, are also contemplated. Furthermore, a plurality of the EVSE connectors, e.g., the EVSE connectors 40, in one instance, may be electrically connected to an intermediate connector, e.g. adapter, converter, combiner, splitter, and so on, that is further connected to the charge port 34 and is configured to combine energy supplied by the plurality of the EVSE connectors for transfer to the traction battery 24 of the vehicle 12 via the charge port 34. Additionally or alternatively, in the vehicle 12 configured to receive wireless power transfer one or more components, e.g., the charge port 34, the power conversion controller 32, and so on, may be adapted to combine power received via one or more wired and/or wireless connections to the EVSE 38.

The EVSE 38 may be configured to provide single- or three-phase AC or DC power to the vehicle 12. Differences in the charge connector 40 and/or charging protocol may exist between an AC, a DC, and an AC/DC capable EVSE 38. The EVSE 38 may be configured to provide one of more of a variety of levels of AC and DC voltage including, but not limited to, Level 1 120 volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on. In some examples, both the charge port 34 and the EVSE 38 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charge port 34 may comprise a plurality of terminals, such as, but not limited to, one or more terminals designated for power exchange, a ground connection, receiving and transmitting control signals, and so on. The recesses of the charge port 34 may, in some instances, comprise 7 terminals, with terminals 1 and 2 designated for Level 1 and 2 AC power exchange, terminal 3 designated for a ground connection, terminals 4 and 5 designated for control signals, and terminals 6 and 7 designated for DC charging, such as, but not limited to, Levels 1, 2, or 3 DC charging. The EVSE 38 and the vehicle 12 may therefore be configured to exchange, e.g., via control signal terminals, one or more parameter values, inquiries, or commands associated with a given charging session between the EVSE 38 and the vehicle 12.

Time required to receive a given amount of electric charge may vary among the different charging methods, voltage and current levels, and other parameters associated with a given charging session. It may, in one instance, take several hours to charge a given battery pack using a single-phase AC charging session. In communicating with one or more controllers of the vehicle 12, e.g., the system controller 48, the on-board power conversion controller 32, and so on, in connection with transferring electric charge to the vehicle 12, the EVSE 38 may be configured to accept requests, inquiries, and/or commands regarding a requested level of charge, voltage, current, and other parameters related to a given charging session. In some examples, the EVSE 38 may be configured to initiate a charging session at a first level of charge, magnitude of voltage, magnitude of current and so on, and, responsive to a request from the one or more controllers of the vehicle 12, may modify the level of charge, magnitude of voltage, magnitude of current, or another parameter associated with transferring electric charge to the vehicle 12 in a given charging session. In other examples, one or more controllers of the vehicle 12, e.g., the system controller 48, may command the EVSE 38 to increase or decrease magnitude of one or more voltage, current, and so on of the electric charge being transferred to the vehicle 12. The one or more controllers, in one instance, may issue the command to the EVSE 38 to increase or decrease a magnitude of charge current in response to detecting that one or more switches or contactors of the BEC 44 has opened during charging.

While the above description is directed to transferring energy to a traction battery of an electric or a hybrid electric vehicle, the disclosure is not so limited and transfer of energy to and from a rechargeable battery of any electronic devices, such as, but not limited to, mobile phones, laptops, tablets, global positioning system (GPS) devices, audio players, gaming controllers, cameras, power hand tools, and so on, is also contemplated. Furthermore, the one or more controllers of the vehicle 12, such as controllers 26, 28, 32, 48, 50, and so on, may each include one or more processors connected with both a memory and a computer-readable storage medium and configured to perform instructions, commands, and other routines in support of the processes described herein. For instance, the controllers may be configured to execute instructions of one or more vehicle applications to provide features such as detecting relevant parameter values and displaying notifications including the values, issuing instructions, and so on, regarding charging time, charging rate, and other parameters associated with charge transfer. Such instructions and other data may be maintained in a non-volatile manner using a variety of types of computer-readable storage medium. The computer-readable medium (also referred to as a processor-readable medium or storage) includes any non-transitory (e.g., tangible) medium that participates in providing instructions or other data that may be read by the processor of the computing platform. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. In other examples, the vehicle 12 may include more or fewer controllers. Additionally or alternately, one or more vehicle 12 systems, subsystem, or components may include more or fewer controllers than shown that are configured to perform more or fewer and same or different processes, functions, or operations.

Figure 2:
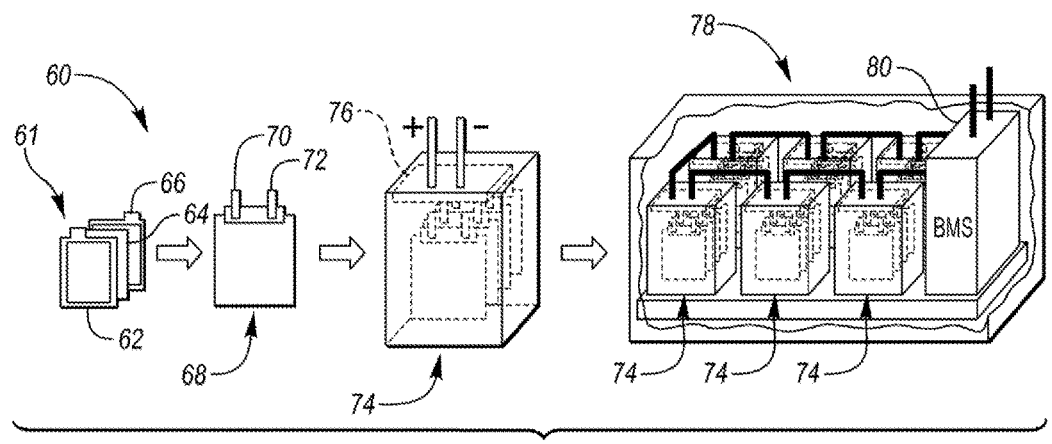
FIG. 2 is a block diagram illustrating traction battery components.

In reference to FIG. 2, a block diagram illustrating an example arrangement 60 for one or more portions the traction battery 24 is shown. The traction battery 24 may include a plurality of mono-cells 61, each having a cathode electrode layer (hereinafter, cathode electrode) 62 and anode electrode layer (hereinafter, anode electrode) 66, also referred to as positive and negative electrodes, respectively, separated by one or more separators 64. The separators 64 may comprise an electrolyte and may enable current flow (ion movement) between the cathode and anode electrodes 62, 66 of the mono-cells 61. Each of the mono-cells 61 may further have a predefined nominal voltage.

The predefined number of mono-cells 61, e.g., 20, may be connected together in series or in parallel to define a battery cell 68 including a positive terminal 70 connected with the cathode electrode 62 and a negative terminal 72 connected with the anode electrode 66. The mono-cells 61 and the battery cells 68 may, for example, be electrochemical cells, capacitors, or other types of energy storage device implementations. The mono-cells 61 and the battery cells 68 may be arranged in any suitable configuration and configured to receive and store electric energy for use in operation of the vehicle 12. Each cell 68 may provide a same or different nominal threshold of voltage. While the traction battery 24 is described to include, for example, electrochemical battery cells, other types of energy storage device implementations, such as capacitors, are also contemplated.

The battery cells 68 may be further arranged into one or more arrays, sections, or modules further connected in series or in parallel. For example, a plurality of the battery cells 68 connected together in series may comprise a battery module 74. The battery module 74 may include a data connection 76 allowing one or more controllers of the vehicle 12, e.g., the BEC 44, to enable and disable energy flow to and from the battery module 74. Additionally or alternatively, the data connection 76 may include one or more cell sensors in connection with one or more controllers of the vehicle 12, e.g., the battery controller 50. The cell sensors may, for example, include one or more of temperature sensors, voltage sensors, current sensors, and so on.

A predefined number of the battery modules 74 connected together in series or in parallel may define a battery pack 78. The battery pack 78 may include a battery management system 80 configured to monitor and manage, such as via the data connection 76, one or more sub-components of the battery pack 78. In one example, the battery management system 80 may be configured to monitor temperature, voltage, and/or current of the mono-cells 61, the battery cells 68, the battery modules 74, and so on. The battery management system 80 may be in communication with one or more of the BEC 44 and the battery controller 50 and may enable energy flow to and from the battery pack 78 in response to a signal or a command from the BEC 44 and/or the battery controller 50. The traction battery 24 may, in one example, define one or more components similar to those described in reference FIG. 2. Furthermore, the traction battery 24 defining additional and/or different components not specifically referenced in FIG. 2 is also contemplated.

Figure 3:
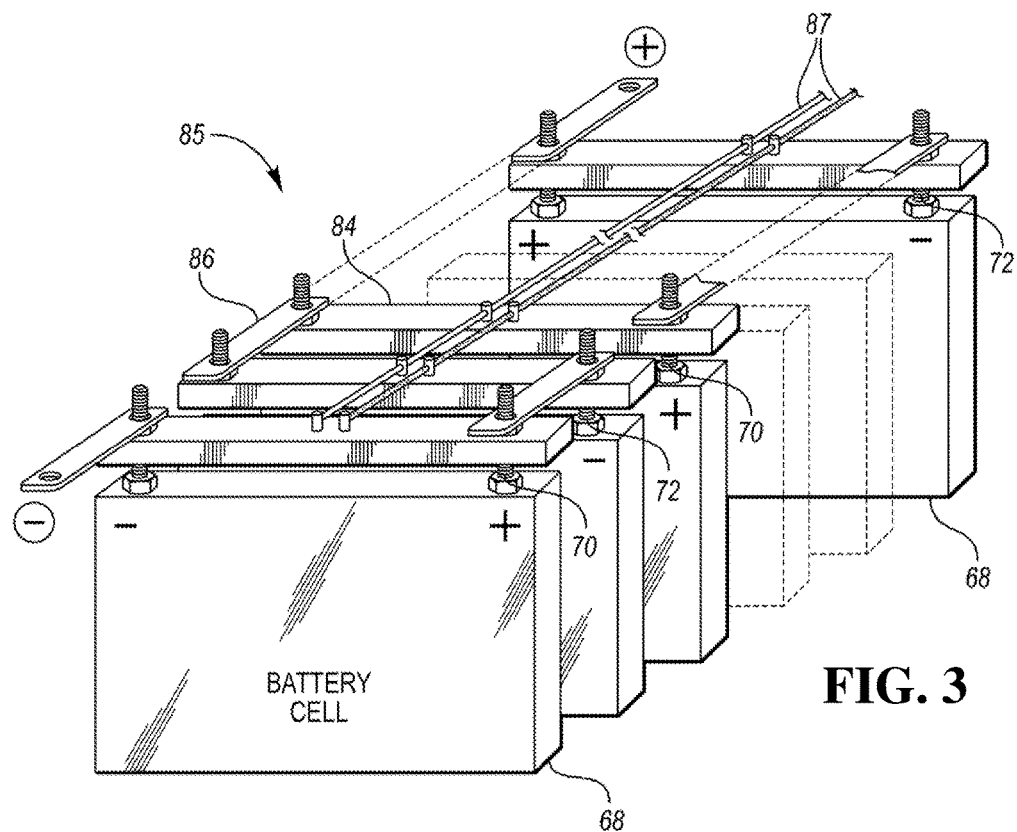
FIG. 3 is a block diagram illustrating connections between traction battery cells.

In reference to FIG. 3, a block diagram illustrating an example arrangement 85 for a plurality of the battery cells 68 connected in series is shown. In one example, a plurality of busbars 86 may each connect the positive terminal 70 of a given battery cell 68 with the negative terminal 72 of another one of the battery cells 68, thereby providing a series connection between respective battery cells 68. A bypass bar 84 may be connected between the positive and negative terminals 70, 72 of the battery cell 68 and may enable current to flow passed a given battery cell 68, such as when a fault was identified with the given battery cell 68.

A shared bus connection 87 may enable data collection from one or more of the battery cells 68. The traction battery 24 may, in one example, define one or more components similar to those described in reference FIG. 3. Furthermore, the traction battery 24 that defines additional and/or different components not specifically referenced in FIG. 3 is also contemplated.

Figure 4A:
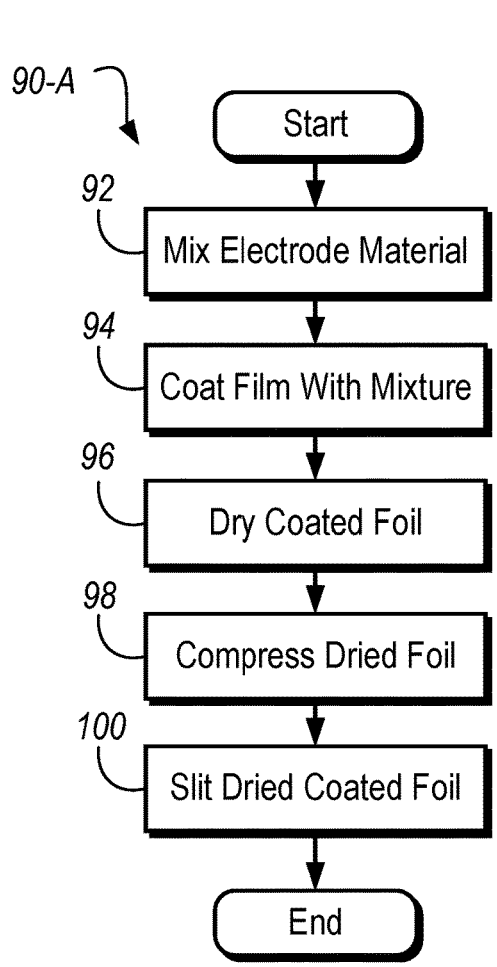
FIGS. 4A-4B are flowcharts illustrating algorithms for a fabrication process.

FIG. 4A illustrates an example coating process flow 90-A for coating positive and negative electrodes 62, 66. Coating of the electrodes 62, 66 may define coating active electrode materials on both sides of metallic foils defining current collectors conducting the current in and out of the cell 68. In some examples, the anode coating material may define carbon material and the cathode coating material may define lithium metal oxide material or another common cathode material. The respective electrode materials may be mixed with a conductive binder, at operation 92, to form a coating material which is spread, at operation 94, on a surface of the foil. At operation 96, the coated foil may be dried (or baked) in a long drying oven to fuse the electrode material onto the foil. Thickness of the electrode coating may be reduced, e.g., compressed, at operation 98, using a cutting instrument disposed above the surface of the foil. The coated foils may be separated into sections having a predefined size, at operation 100, using slitting machines.

Figure 4B:
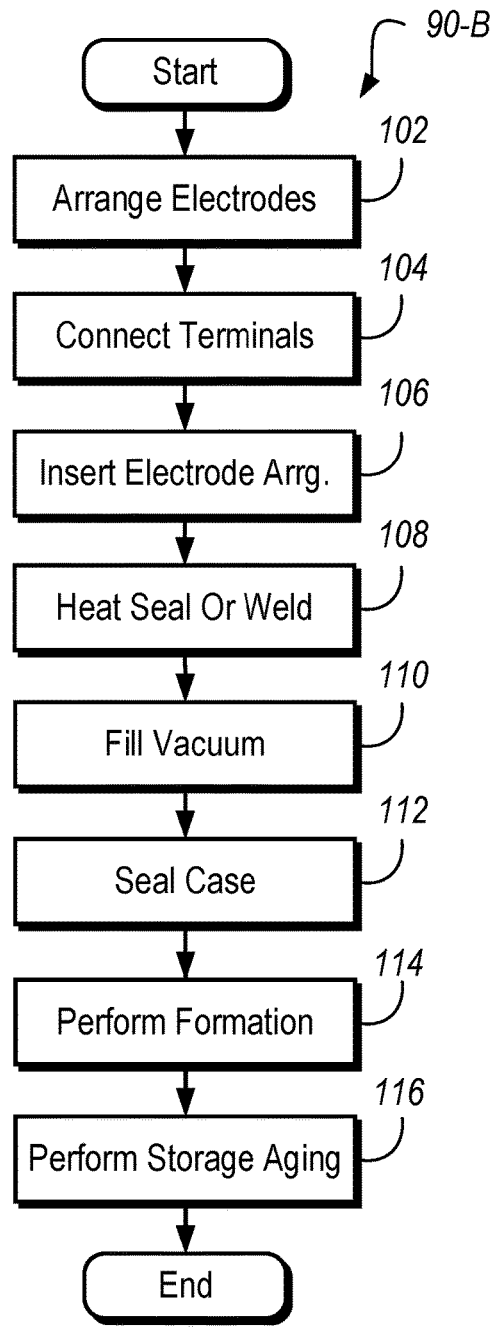

The electrode coating process 90-A described in reference to FIG. 4A may be followed by an example fabricating process 90-B illustrated in FIG. 4B. The fabrication process 90-A may include building the electrode sub-assembly in which the separator 64 is disposed between the cathode and anode electrodes 62, 66, respectively. Arrangement of the electrodes 62, 66, at operation 102, may, for example, be one of a stacked arrangement, e.g., for use in pouch cells, and a spiral wound arrangement, e.g., for use in prismatic can and cylindrical cells. At operation 104, the resulting electrodes 62, 66 may be connected to respective terminals 70, 72 and the resulting electrode arrangement may be inserted into a case, at operation 106. The case may then be sealed, at operation 108, using, for example, one of a laser welding and heating process leaving an opening for injecting the electrolyte into the case.

Vacuum of the cell may be filled, at operation 110, with the electrolyte and the resulting electrode sandwich may be sealed, at operation 112. In some examples, prior to, during, or following one or more of the operations 108-112, a gassing pouch connected to the electrode compartment via a channel, may be formed using cold forming, vacuum drawing, or another process. The gassing pouch may define a reservoir configured to collect any gas generated during one or more phases of the fabrication process, such as aging, storage, pre-discharge, formation, and so on.

During formation, at operation 114, the cell may undergo, for example, one or more precisely controlled charge/discharge cycles to activate the working (host) materials to transform them into their useable form. In some examples, the charge cycling may begin with a low voltage that builds up gradually causing an SEI layer to form on the anode electrode 62. The SEI layer may define a passivating layer configured to control charging of the cell. During the formation phase, a testing device defining positive and negative leads may be connected to each of the electrodes. The testing device may include a controller configured to gather and store data related to one or more operating parameters of the cell 68, such as, but not limited to, capacity and impedance. At operation 106, the cell 68 may undergo a storage aging phase to stabilize materials of the cell 68.

One or more phases of the fabrication process 90-B, such as aging, storage, pre-discharge, formation, and so on, may generate gas. In the cells 68 fabricated to include the gassing pouch, the gassing pouch may be configured to collect the generated gas via the connecting channel with the electrode sandwich. Following completion of gas collection the connecting channel between the electrode sandwich and the gassing pouch may be sealed using one or more heat-seal and pressure-seal methods.

While the phases of the example coating process 90-A and the example fabrication process 90-B discussed in reference to FIGS. 4A and 4B, respectively, are illustrated in order, performing one or more phases in a different order or performing more or fewer phases prior to, during, or after one or both of the processes 90-A and 90-B is also contemplated.

FIG. 5A illustrates an example pouch cell 68 configuration (hereinafter, standard cell configuration) 120 during one or more phases of a cell 68 fabrication process, e.g., the fabrication process 90-B. Accordingly, the standard cell configuration 120, as illustrated, for example, in FIG. 5A, may be a subset of operations or phases of a larger cell fabrication process (hereinafter, a formation, sealing, cutting (FSC) process).

The standard cell configuration 120 may include an electrode sandwich region (hereinafter, electrode sandwich) 122. The electrode sandwich 122 may be a stacked design, wound design, thin film design, and so on and may define positive and negative terminals 126, 128 connected to a cathode electrode and an anode electrode, respectively, with each electrode including a respective current collector region. The electrode sandwich 122 may further include a separator, e.g., the separator 64, disposed between the cathode and anode electrodes.

A gassing pouch 124 may be connected to the electrode sandwich 122 and may define at least one gassing gap 134 therebetween. In one example, the electrode sandwich 122 may define a pair of opposing sides (or walls) 130, 132 and may connect to the gassing pouch 124 along the first side (or wall) 130 to define the gassing gap 134 therebetween. Material 136 between the electrode sandwich 122 and the gassing pouch 124 may include one or more laminate sheets folded over themselves or joined to conform to a size and shape of the electrode sandwich 122 and the gassing pouch 124 and forming a partial seal that defines the gassing gap 134. While the gassing pouch 124 is illustrated as separate from the material 136, in some examples, the gassing pouch 124 may be a recess pouch formed, e.g., via cold forming or vacuum drawing, from one or more portions (sheets) of the material 136.

The gassing pouch 124 may define a reservoir configured to collect any gas generated during one or more phases of the fabrication process, e.g., the fabrication process 90-B described in reference to FIG. 4B, such as, but not limited to, aging, storage, pre-discharge, formation, and so on. The gassing pouch 124 may be formed using cold forming, vacuum drawing, or another process, prior to, during, or following one or more phases of the fabrication process. Following completion of gas collection, the gassing gap 134 between the electrode sandwich 122 and the gassing pouch 124 may be sealed and the gassing pouch 124 subsequently may be separated (detached or cut off) from the electrode sandwich 122. Illustrated in FIG. 5B is an example electrode sandwich 138A following removal of the gassing pouch 124.

FIG. 5C illustrates an example replenishment cell configuration (hereinafter, lithium replenishment configuration) 140 during one or more phases of a cell 68 fabrication process, e.g., the fabrication process 90-B. Accordingly, the lithium replenishment configuration 140, as illustrated, for example, in FIG. 5C, may be a subset of a cell fabrication process (hereinafter, a formation, replenishment, sealing, cutting (FRSC) process).

The lithium replenishment configuration 140 may include the gassing pouch 124 and the electrode sandwich 122 connected along the first wall 130 of the electrode sandwich 122 and defining at least one gassing gap 134 therebetween. Additionally or alternatively, the lithium replenishment configuration 140 of the FRSC process may include a third electrode region 142 connected to the electrode sandwich 122 along the second wall 132 of the sandwich 122 opposite the first wall 130 and defining a plurality of replenishment gaps 148 therebetween. The replenishment gaps 148 may be formed using a partial seal between the regions 122, 142, and in some examples, the replenishment gaps 148 may be filled with an electrolyte material.

The lithium replenishment cell configuration 140, accordingly, includes an additional region, the third electrode region 142, configured to house a third electrode 144. The third electrode 144 may define a lithium-containing material, such as lithium foil, $LiNi_xMn_yCo_z$, $LiFePO_4$, $LiMnO_2$, $LiCoO_2$, $LiNi_xCo_yAl_zO_2$, lithiated graphite, lithiated Si, lithiated Sn, lithium titanate, or another lithiated host material or a combination of lithiated materials configured to remain stable within the lithium-ion traction battery 24. The third electrode 144 may include a conducting agent and binder material, and may be a coated mixture (e.g., lithium-containing, conducting agent, and binder) on an electrically conductive foil. The coated foil may be connected to a third electrode terminal 146. The third electrode 144 may be configured to replenish the cyclable lithium lost during one or more phases of the fabrication process, such as, but not limited to, aging, storage, pre-discharge, and formation.

The third electrode region 142 may be configured to maintain ionic conductivity with the electrode sandwich 122 throughout the fabrication process. In one example, electrolyte material (not shown) may fill the third electrode region 142 substantially surrounding (enveloping) the third (replenishment) electrode 144 included therein. The electrolyte material may extend, e.g., via the replenishment gaps 148, from the third electrode region 142 to a neighboring compartment including the electrode sandwich 122 (to surround, submerse, or envelop the sandwich 122) causing the third electrode region 142 and the third (replenishment) electrode 144 to be in ionic conductivity with the electrode sandwich 122.

The third electrode region 142 and/or the third electrode 144 may be configured to perform lithium replenishment. As described in reference to at least FIGS. 6A-6B, a testing device defining positive and negative leads may be configured to connect to the third electrode terminal 146 and the terminals 126, 128 of the electrode sandwich 122 to cause external current flow therebetween. The testing device-generated current flow may cause lithium ions to be released by the lithium-containing third electrode 144 to fill lithium ion voids in either positive or negative electrode of the electrode sandwich 122, thereby, replenishing the cyclable lithium lost during one or more phases of the fabrication process.

In response to an amount of replenished cyclable lithium being greater than a predefined amount, the one or more replenishment gaps 148 between the third electrode 144 of the third electrode region 142 and the electrode sandwich 122 may be sealed and the third electrode region 142 including the third (replenishment) electrode 144 and the third electrode terminal 146 may be separated (detached) from the electrode sandwich 122. Illustrated in FIG. 5D is an example electrode sandwich 138B following removal of the gassing pouch 124 and the third electrode region 142. In some examples, sealing of the gassing gap 134 may be performed prior to replenishing amount of cyclable lithium lost during one or more phases of the fabrication process. In some other examples, sealing of the gassing gap 134 may be performed during or after replenishing amount of cyclable lithium lost during one or more phases of the fabrication process and/or during or after sealing and separating the third electrode region 142.

While the standard cell configuration 120 used during fabrication via the FSC process, as described in reference to FIG. 5A, and the lithium replenishment configuration 140 used during fabrication using the FRSC process, as described in reference to FIG. 5C, differ from one another, the final electrode sandwich 138B fabricated using the FRSC process may have the same dimensions and configuration as the final electrode sandwich 138A fabricated using the FSC process. The final electrode sandwich 138B may further conform to one or more other specifications and state or federal requirements pertinent to the cells 68 following completion of the fabrication process, such as, but not limited to, volume, weight, material, device, etc.

The final electrode sandwich 138B formed using the FRSC process may define a capacity value that is greater than a capacity of the final electrode sandwich 138A fabricated using the FSC process. In one example, the capacity of the final electrode sandwich 138B fabricated using the FRSC process may be 10% greater than the capacity of the final electrode sandwich 138A fabricated using the FSC process. Furthermore, the capacity of the final electrode sandwich 138B fabricated using FRSC process may correspond to capacity of the electrode sandwich 122 prior to undergoing cyclable lithium loss during one of more phases of the fabrication process. Still further, the capacity of the final electrode sandwich 138B fabricated using the FRSC process may be greater than the capacity of that the electrode sandwich 122 both following a loss of the cyclable lithium during one or more phases of the fabrication process and prior to the replenishment phase of the FRSC process.

FIG. 6A illustrates a lithium replenishment phase 150-A of the FRSC fabrication process using the third electrode region 142 and the third electrode 144. A testing device 152, e.g., a battery testing machine, defining positive and negative leads may be connected to the third electrode terminal 146A and the negative terminal 128 of the electrode sandwich 122, respectively. The testing device 152 may be configured to use a combination of galvanostatic and potentiostatic control to cause external current flow from the negative terminal 128 of the electrode sandwich 122 and through the third electrode terminal 146A to the third (lithium replenishment) electrode 144 causing lithium ions to be released by the lithium-containing third electrode 144.

The external current flow may cause the released lithium ions to move through the electrolyte-filled gaps 148 in the partial seal to fill lithium ion gaps in the anode host material of the negative terminal 128. A direction 154 of the movement of the lithium ions released by the third electrode 144 may, thus, be according to (consistent with) a direction of the external current flow current. The testing device 152 may be configured to stop current flow to stop the release of the lithium ions by the third electrode 144 in response to an amount of the lithium inserted into anode host material corresponding to a predefined amount, e.g., corresponding to an amount of lithium lost during one or more phases of the fabrication process.

The gaps 148 between the third electrode region 142 and the electrode sandwich 122 may be sealed in response to the amount of replenished lithium corresponding to the amount of lost lithium. The third electrode region 142 may be detached (cut off) from the electrode sandwich 122 following completion of the sealing operation.

FIG. 6B illustrates a lithium replenishment phase 150-B of the FRSC fabrication process using the third electrode region 142 and the third electrode 144. The positive and negative leads of the testing device 152 may be connected to the positive terminal 126 of the electrode sandwich 122 and the third electrode terminal 146B, respectively. The testing device 152 may be configured to use a combination of galvanostatic and potentiostatic control to cause external current flow from the positive terminal 126 of the electrode sandwich 122 and through the third electrode terminal 146B to the third electrode 144 causing lithium ions to be released by the lithium-containing third electrode 144.

The external current flow may cause the released lithium ions to move through the electrolyte-filled gaps 148 in the partial seal to fill the lithium ion gaps in the cathode host material of the positive terminal 126. A direction 154 of the movement of the lithium ions released by the third electrode 144 may, thus, be according to (consistent with) a direction of flow of the external current. The testing device 152 may be configured to stop the flow of current to stop the release of the lithium ions by the third electrode 144 in response to an amount of the lithium inserted into cathode host material corresponding to a predefined amount, e.g., corresponding to an amount of lithium lost during one or more phases of the fabrication process.

The gaps 148 between the third electrode region 142 and the electrode sandwich 122 may be sealed in response to the amount of replenished lithium corresponding to the amount of lost lithium. The third electrode section may be separated (or otherwise detached) from the electrode sandwich section following completion of the sealing operation.

Figure 7:
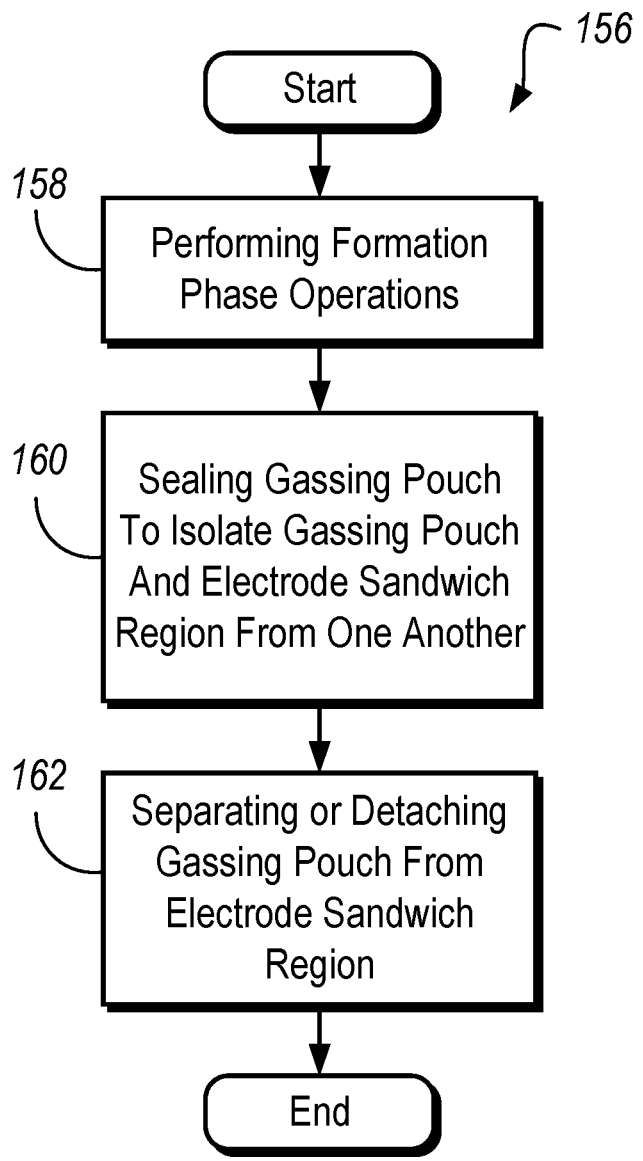
FIG. 7 is a flowchart illustrating an algorithm for the FSC process.

FIG. 7 illustrates an example FSC process 156 used to fabricate the electrode sandwich 138A using the standard cell configuration 120, such as described in reference to FIG. 5A. The example FSC process 156 may include, at operation 158, performing a formation phase, e.g. storing the electrode sandwich 122 at a predefined temperature and/or charging and discharging the electrode sandwich 122 at a slow rate under well-controlled environmental conditions. The SEI layer formed during the formation phase of the FSC process 156 may cause gases to be generated within or around the electrode sandwich 122. The generated excess gases may be displaced into the gassing pouch 124 via the gassing gap 134.

At operation 160, the excess gases may be fully isolated from the electrode sandwich 122 section within the gassing pouch 124 when the gassing gap 134 between the electrode sandwich 122 and the gassing pouch 124 is sealed, e.g., using a hot press technique. The gassing pouch 124, at operation 162, may be separated (cut off or otherwise detached) from the electrode sandwich 122 of the cell to complete the FSC process 156 to fabricate the electrode sandwich 138A, such as the electrode sandwich 138A described at least in reference to FIG. 5B.

Figure 8:
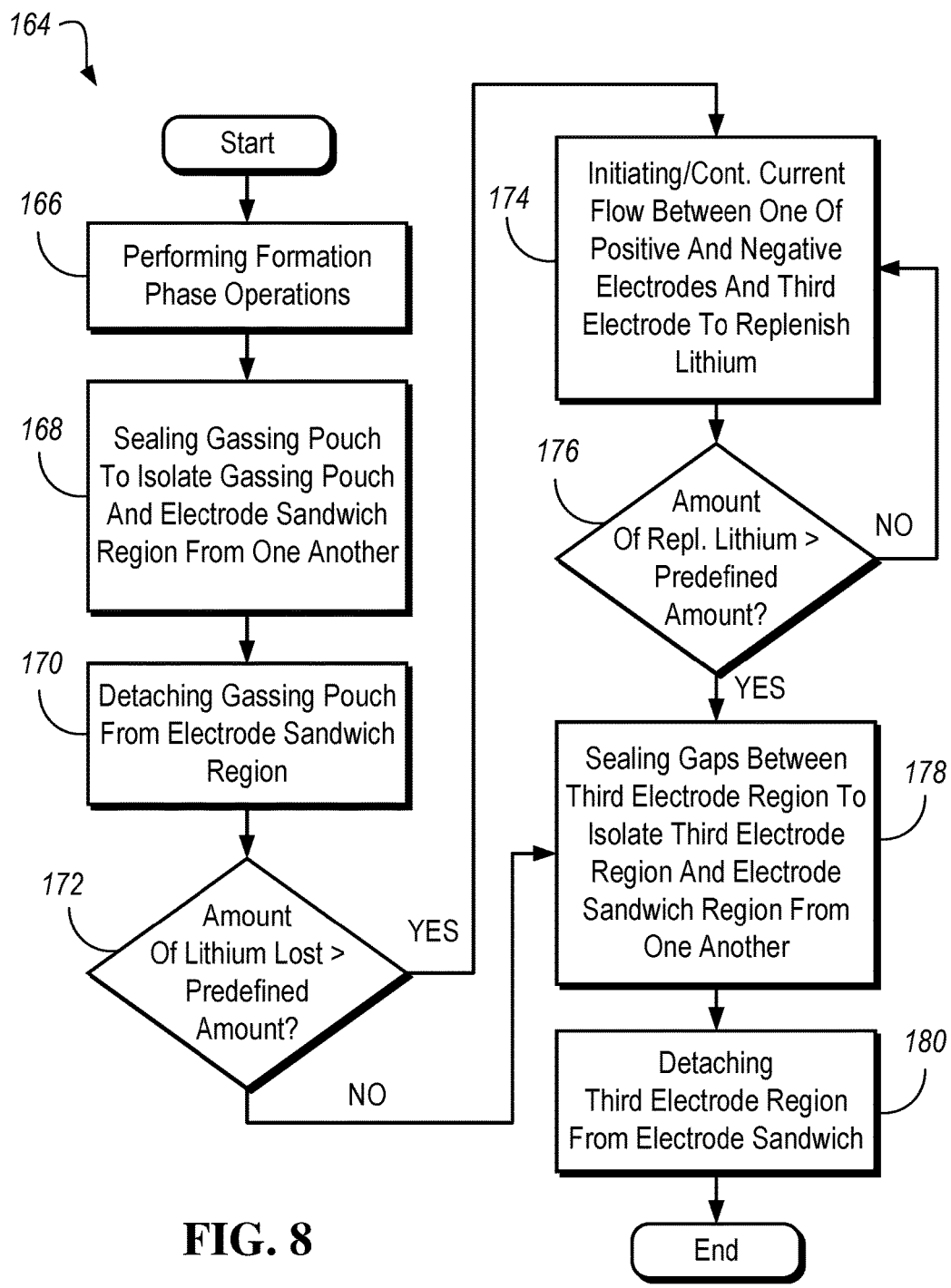
FIG. 8 is a flowchart illustrating an algorithm for the FRSC process.

FIG. 8 illustrates an example FRSC process 164 for replenishing lithium lost during one or more phases of the fabrication process of the electrode sandwich 138B, such as in the electrode sandwich 138B described in reference to FIG. 5D. The FRSC process 164 may include one or more operations similar to those described in reference to the FSC process 156 of FIG. 7. In one example, operations 166-170 of the FRSC process 164 may be similar to operations 158-162 of the FSC process 156.

Additionally or alternatively, at operation 172, the testing device 152 may determine whether an amount of cyclable lithium lost during one or more phases of the fabrication process is greater than a predefined amount. In one example, performing the formation phase, e.g., at operations 158 and/or operation 166, may cause a predefined amount of the cyclable lithium to be consumed, thereby reducing a quantity of the cyclable lithium that defines capacity of the electrode sandwich 138A. In another example, following completion of the formation phase, at operation 166, a fully discharged electrode sandwich 122 may have no lithium within the anode host material of the negative terminal 128 and/or may have vacant host sites within the cathode host material of the positive terminal 126.

In response to determining, at operation 172 that the amount of cyclable lithium lost during one or more phases of the fabrication process is less than a predefined amount, the FRSC process 164 may proceed to operation 178 where one or more replenishment gaps 148 between the electrode sandwich 122 and the third electrode region 142 may be sealed using one or more sealing techniques.

In response to determining, at operation 172, that the amount of cyclable lithium lost during one or more phases of the fabrication process is greater than a predefined amount, the testing device 152, at operation 174, may initiate an external current flow between one of positive and negative electrodes of the electrode sandwich 122 and the third electrode 144 of the third electrode region 142. In one example, the testing device 152 connected to the third electrode terminal 146A and the negative terminal 128 may use a combination of galvanostatic and potentiostatic control to cause external current flow from the negative terminal 128 of the electrode sandwich 122 through the third electrode terminal 146A to the third electrode 144 causing lithium ions to be released by the lithium-containing third electrode 144. In another example, the testing device 152 connected to the negative third electrode terminal 146B and the positive terminal 126 may use a combination of galvanostatic and potentiostatic control to cause external current flow from the positive terminal 126 of the electrode sandwich 122 and through the third electrode terminal 146B to the third electrode 144 causing lithium ions to be released by the lithium-containing third electrode 144.

At operation 176, the testing device 152 may be configured to determine whether an amount of the lithium inserted into anode and/or cathode host material is greater than a predefined amount. The testing device 152 may, for instance, determine whether an amount of the lithium inserted into anode and/or cathode host material is greater than an amount of lithium lost during one or more phases of the fabrication process. In response to determining, at operation 176, that an amount of the lithium inserted into anode and/or cathode host material is less than a predefined amount, the testing device 152 may return to operation 174 where may continue causing external current flow from the negative terminal 128 of the electrode sandwich 122 through the third electrode terminal 146A to the third electrode 144 and/or from the positive terminal 126 of the electrode sandwich 122 and through the third electrode terminal 146B to the third electrode 144 causing lithium ions to be released by the lithium-containing third electrode 144

In response to determining, at operation 174, that an amount of the lithium inserted into anode and/or cathode host material is greater than a predefined amount, the testing device 152, at operation 178, may be configured to stop current flow and may command one or more of the replenishment gaps 148 between the third electrode region 142 and the electrode sandwich 122 to be sealed. At operation 180, the third electrode region 142 may be detached (e.g., cut off) from the electrode sandwich 122 following completion of the sealing operation to define the final electrode sandwich 138B. The final electrode sandwich 138B formed using the FRSC process 164 may define a capacity value that is greater than a capacity of the final electrode sandwich 138A fabricated using the FSC process 156. In one example, the capacity of the final electrode sandwich 138B fabricated using the FRSC process 164 may be 10% greater than the capacity of the final electrode sandwich 138A fabricated using the FSC process 156.

At this point, the FRSC process 164 may end. In some examples, the FRSC process 164 may be repeated in response to the performance of one or more formation phase operations or in response to completion of another phase or operation. While operations 168-170 are shown in the FRSC process 164 following, at operation 166, performing formation phase operations and prior to, at operations 172-180, replenishing amount of cyclable lithium lost during formation, one or more operations 168-170 may be performed during or after one or more operations 172-180 of the FRSC process 164.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method for fabricating an electrode sandwich, comprising:
    responsive to an amount of cyclable lithium lost being greater than a predefined threshold, initiating, by a controller, current flow between the sandwich and a lithium replenishment electrode in ionic conductivity with the sandwich via replenishment gaps to transfer lithium thereto; and,
    responsive to an amount of transferred lithium corresponding to the amount lost, hot-press sealing the replenishment gaps and detaching the replenishment electrode from the sandwich.

2. The method of claim 1 further comprising hot-press sealing a gassing gap between the sandwich and a gassing pouch, and detaching the pouch from the sandwich.

3. The method of claim 2, wherein the cyclable lithium is lost during a solid electrolyte interphase layer formation phase of the fabrication.

4. The method of claim 1, wherein the transferred amount corresponds to a plurality of lithium ions released by the replenishment electrode in response to the current flow.

5. The method of claim 4, wherein the lost amount corresponds to a plurality of ionic voids in electrodes of the sandwich, and wherein the transferred ions fill the voids.

6. The method of claim 1, wherein the current flow defines a charge transfer loop beginning at one of negative and positive terminals of the sandwich, each connected with a corresponding sandwich electrode, and entering the replenishment electrode via a replenishment terminal prior to being directed to the sandwich electrode therefrom.

7. The method of claim 6, wherein a direction of the transferred lithium is according to a direction of the loop.

8. The method of claim 1, wherein the ionic conductivity is established using electrolyte material that envelops the replenishment electrode and extends through the replenishment gap to envelop at least a portion of the electrode sandwich.

9. A battery cell, comprising:
    an electrode sandwich having a pair of opposing walls;
    a gassing pouch connected along the first wall and defining a gassing gap therebetween, the gassing gap configured to transfer gasses from the electrode sandwich to the gassing pouch; and
    a lithium replenishment electrode region connected along a second wall and defining a replenishment gap therebetween, the replenishment gap configured to transfer lithium ions from the region to the sandwich.

10. The cell of claim 9, wherein both the gassing gap and the replenishment gap are further configured to be heat-press sealed to detach a corresponding one of the pouch and the region from the sandwich.

11. The cell of claim 9, wherein the replenishment electrode region includes a lithium replenishment electrode configured to release the ions responsive to being exposed to an electrical current flow between the sandwich and the replenishment electrode.

12. The cell of claim 9, wherein the replenishment electrode defines one of lithium foil, $LiFePO_4$, $LiMnO_2$, $LiCoO_2$, lithiated graphite, lithiated Si, lithiated Sn, or lithium titanate material.

13. A method for fabricating an electrode sandwich of a battery cell, comprising:
    responsive to a solid electrolyte interphase layer forming in the sandwich, initiating, by a controller, current flow between the sandwich and a lithium replenishment electrode in ionic conductivity therewith via a replenishment gap to cause the replenishment electrode to supply lithium to the sandwich; and,
    responsive to an amount of the supplied lithium corresponding to an amount of lithium lost during the forming, hot-press sealing the replenishment gap and detaching the replenishment electrode.

14. The method of claim 13, wherein the forming is during a controlled charging and discharging of the sandwich.

15. The method of claim 13 further comprising hot-press sealing a gassing gap between the sandwich and a gassing pouch, and detaching the pouch from the sandwich.

16. The method of claim 15, wherein the supplied amount corresponds to a plurality of lithium ions released by the replenishment electrode in response to the current flow.

17. The method of claim 13, wherein the current flow defines a charge transfer loop beginning at one of negative and positive terminals of the sandwich, each connected with a corresponding sandwich electrode, and entering the replenishment electrode via a replenishment terminal prior to being directed to the sandwich electrode therefrom.

18. The method of claim 17, wherein a direction of the supplied ions is according to a direction of the loop.

19. The method of claim 13, wherein the lost amount corresponds to a plurality of ionic voids in electrodes of the sandwich and the supplied ions fill the voids.

20. The method of claim 13, wherein the ionic conductivity is established using electrolyte material that envelops the replenishment electrode and extends through the replenishment gap to envelop at least a portion of the sandwich.

* * * * *